US012086587B2

(12) United States Patent
Mooney et al.

(10) Patent No.: US 12,086,587 B2
(45) Date of Patent: *Sep. 10, 2024

(54) FIRMWARE UPDATE MECHANISM OF A POWER DISTRIBUTION BOARD

(71) Applicant: GM Cruise Holdings LLC, San Francisco, CA (US)

(72) Inventors: Charles Z. Mooney, San Francisco, CA (US); James B. Lohmeyer, Oakland, CA (US); Christopher Allen Johnson, Clever, MO (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,547

(22) Filed: Jun. 23, 2023

(65) Prior Publication Data

US 2023/0333842 A1 Oct. 19, 2023

Related U.S. Application Data

(63) Continuation of application No. 17/361,985, filed on Jun. 29, 2021, now Pat. No. 11,726,772.

(51) Int. Cl.
*G06F 8/656* (2018.01)
*G06F 8/71* (2018.01)
(Continued)

(52) U.S. Cl.
CPC .............. *G06F 8/656* (2018.02); *G06F 8/71* (2013.01); *G06F 9/4401* (2013.01);
(Continued)

(58) Field of Classification Search
CPC ............. G06F 11/1417; G06F 11/1433; G06F 11/1441; G06F 8/656; G06F 8/71; G06F 9/4401
See application file for complete search history.

(56) References Cited

U.S. PATENT DOCUMENTS 11,726,772 B2 * 8/2023 Mooney ................ G06F 9/4401
 713/1
2010/0082955 A1 * 4/2010 Chhabra ................ H04L 9/3247
 713/1

(Continued)

*Primary Examiner* — Terrell S Johnson
(74) *Attorney, Agent, or Firm* — Michael DiCato (57) ABSTRACT

The disclosed technology relates to solutions for improving a firmware update mechanism and in particular, for improving a firmware update mechanism of a power distribution board by utilizing different boot procedures. A process of the disclosed technology can include steps for receiving, at a microcontroller, a firmware update, wherein the firmware update is transmitted by a computer powered by a power distribution board associated with the microcontroller, initiating, by the microcontroller, a warm boot procedure using the firmware update, and marking the warm boot procedure as successful if a message received from the computer indicates that the firmware update is successful. In some aspects, the process can further include steps for determining a power reset of the computer, initiating, by the microcontroller, a cold boot procedure using the firmware update, and marking the firmware update as proven if the message from the computer indicates that the firmware update is successful. Systems and machine-readable media are also provided.

20 Claims, 7 Drawing Sheets

(51) Int. Cl.
*G06F 9/4401* (2018.01)
*G06F 11/14* (2006.01)

(52) U.S. Cl.
CPC ...... *G06F 11/1417* (2013.01); *G06F 11/1433* (2013.01); *G06F 11/1441* (2013.01)

(56) References Cited

U.S. PATENT DOCUMENTS

2019/0243637 A1* 8/2019 Nachimuthu ........... G06F 8/656
2020/0073580 A1* 3/2020 Frolikov ............... G06F 9/4401

* cited by examiner

FIRMWARE UPDATE MECHANISM OF A POWER DISTRIBUTION BOARD

CROSS-REFERENCE TO RELATED APPLICATIONS

This application is a continuation of U.S. application Ser. No. 17/361,985, filed on Jun. 29, 2021, which is hereby incorporated by reference in its entirety.

BACKGROUND

1. Technical Field

The subject technology relates to solutions for improving a firmware update mechanism and in particular, for improving a firmware update mechanism of a power distribution board by utilizing different boot procedures.

2. Introduction

Autonomous vehicles (AVs) are vehicles having computers and control systems that perform driving and navigation tasks that are conventionally performed by a human driver. Such tasks require the collection and processing of large quantities of data using various sensor types, including but not limited to cameras and/or Light Detection and Ranging (LiDAR) sensors disposed on the AV. In some AV implementations, power delivery to various on-board components, such as the AV sensors and compute nodes, is controlled by a power distribution system, such as a power distribution board (PDB). For example, a PDB can control power supply and distribution of various components residing on AVs. Some PDBs are designed to supply and distribute power to a device for data transmission, for example, a computer that can transmit data to the power distribution board.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology but is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

A power distribution board can provide power to various components including a device that is responsible for providing a firmware update and transmitting data to the power distribution board (e.g., a computer), all of which are residing on AVs. However, due to a mutually dependent relationship between the power distribution board and the computer, a firmware update (e.g., flashing or overwriting of existing firmware) to the power distribution board can potentially cause the power distribution board to stop the power supply to the various components including the computer. Also, corrupt firmware can either immediately cut power to a computer whose power is controlled by the power distribution board or be unable to boot a system once the power of the whole system is completely shut off. To remedy the foregoing limitations, the present disclosure utilizes different boot algorithms to update firmware on the power distribution board without interrupting any outputs and confirm that the firmware is proven. Specifically, the disclosed technology provides solutions for updating firmware on an upstream device (e.g., power distribution board) that controls power to a downstream device (e.g., computer) that transmits data relating to a firmware update. For example, the power distribution board can supply power to the computer and receive data regarding the firmware update from that computer.

Aspects of the disclosed technology address the foregoing limitations of conventional firmware update mechanism of the power distribution board, by providing systems, methods, and machine-readable media that provide solutions for improving a firmware update mechanism by utilizing different boot procedures. More specifically, a firmware update mechanism can be improved based on a mutually dependent relationship between the power distribution board and the computer. As discussed in further detail below, the disclosed technology includes a process for utilizing different boot procedures (e.g., a warm boot procedure and a cold boot procedure) to improve the firmware update of the power distribution board without interrupting the power supply to various components.

Figure 1A:
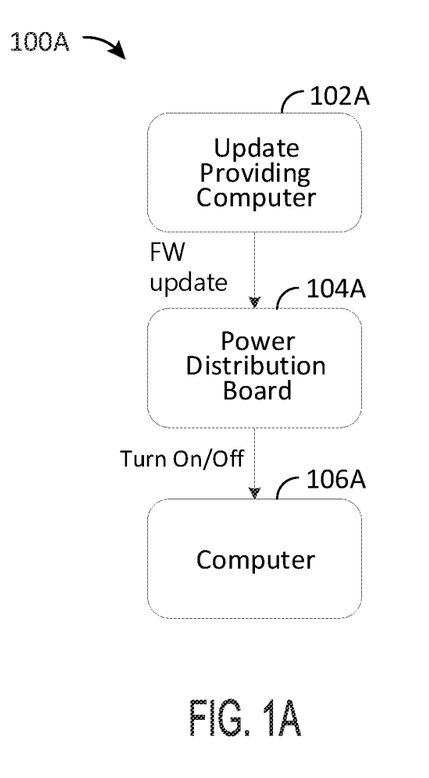
FIG. 1A illustrates a block diagram of a conventional system for a firmware update on a power distribution board.

FIG. 1A illustrates a block diagram of a conventional system 100A for a firmware update mechanism. The conventional system 100A comprises computer 102A that is providing a firmware update, power distribution board 104A, and computer 106A. As depicted in FIG. 1A, in the traditional architectural layout of system 100A, computer 102A that is providing the firmware update is independent of computer 106A whose power is controlled by power distribution board 104A. As such, power distribution board 104A cannot deny power supply to computer 102A that is providing the firmware update.

When power distribution board 104A and computer 102A that provides a firmware update (i.e., updating computer) are fully independent as illustrated in FIG. 1A, there is no risk of getting into an irrecoverable state when updating the firmware on power distribution board 104A. A bad firmware (e.g., malicious or buggy firmware) has no power to prevent the updating computer (e.g., computer 102A) from recovering it with a second update. However, a downside to this design is that a separate computer is required to perform the firmware update, which can be costly and requires additional system to be maintained.

Figure 1B:
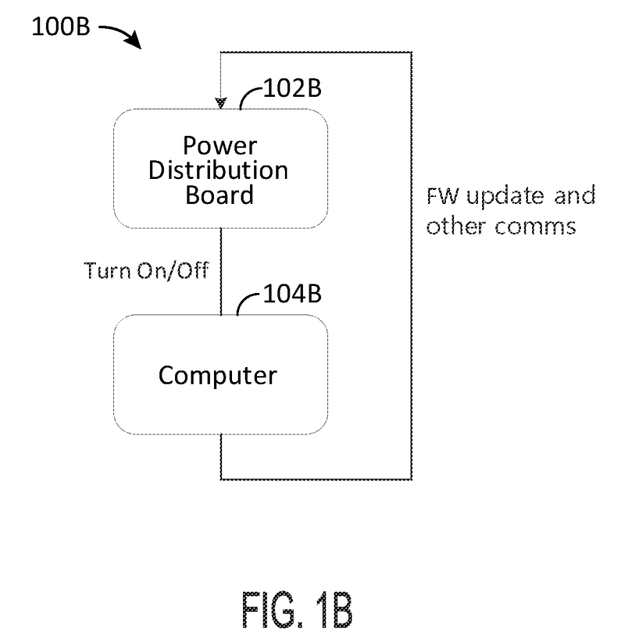
FIG. 1B illustrates a block diagram of an example system for improving a firmware update mechanism of a power distribution board, according to some aspects of the disclosed technology.

On the other hand, if a power distribution board (e.g., power distribution board 102B) and an updating computer (e.g., computer 104B) are mutually dependent, for example, in system 100B as illustrated in FIG. 1B, one less component needs to be maintained. As such, this mutually dependent design can be more desirable from a cost and architectural complexity standpoint. However, a downside of this design is that it involves a risk of getting into an unrecoverable situation when updating a firmware on the power distribution board (e.g., power distribution board 102B) since such update can deny power to the only system (e.g., in an AV) capable of recovering the power distribution board. The disclose technology mitigates the risk of having the mutually dependent design.

FIG. 1B illustrates a block diagram of an example system 100B for improving a firmware update mechanism, according to some aspects of the disclosed technology. Compared to the conventional system for a firmware update as depicted in FIG. 1A, system 100B for improving a firmware update mechanism comprises one less component. System 100B comprises power distribution board 102B and computer 104B. In some embodiments, system 100B can be implemented in an AV system environment where power distribution board 102 controls power distribution on various components (e.g., computer 104B) in the AV system environment.

As illustrated in FIG. 1B, power distribution board 102B and computer 104B are in a mutually dependent relationship where power distribution board 102B controls power supply/distribution on computer 104B, which is responsible for updating firmware on power distribution board 102B. In other words, power distribution board 102B (i.e., an upstream device for power) supplies power to computer 104B while computer 104B (i.e., a downstream device for data) provides a firmware update and transmits communications to power distribution board 102B. As computer 104B is powered by power distribution board 102B, computer 104B can potentially lose power while a firmware update is performed on power distribution board 102B. For example, a bad firmware (e.g., malware) on power distribution board 102B can result in an immediate shut down of computer 104B that is powered by power distribution board 102B or be unable to boot into a system when microcontroller 102B resets. Details regarding improving the firmware update mechanism in such system 100B are further discussed below with respect to FIGS. 2-4.

It is understood that a microcontroller can include various types of computer nodes, including but not limited to, processors and the like.

Figure 2A:
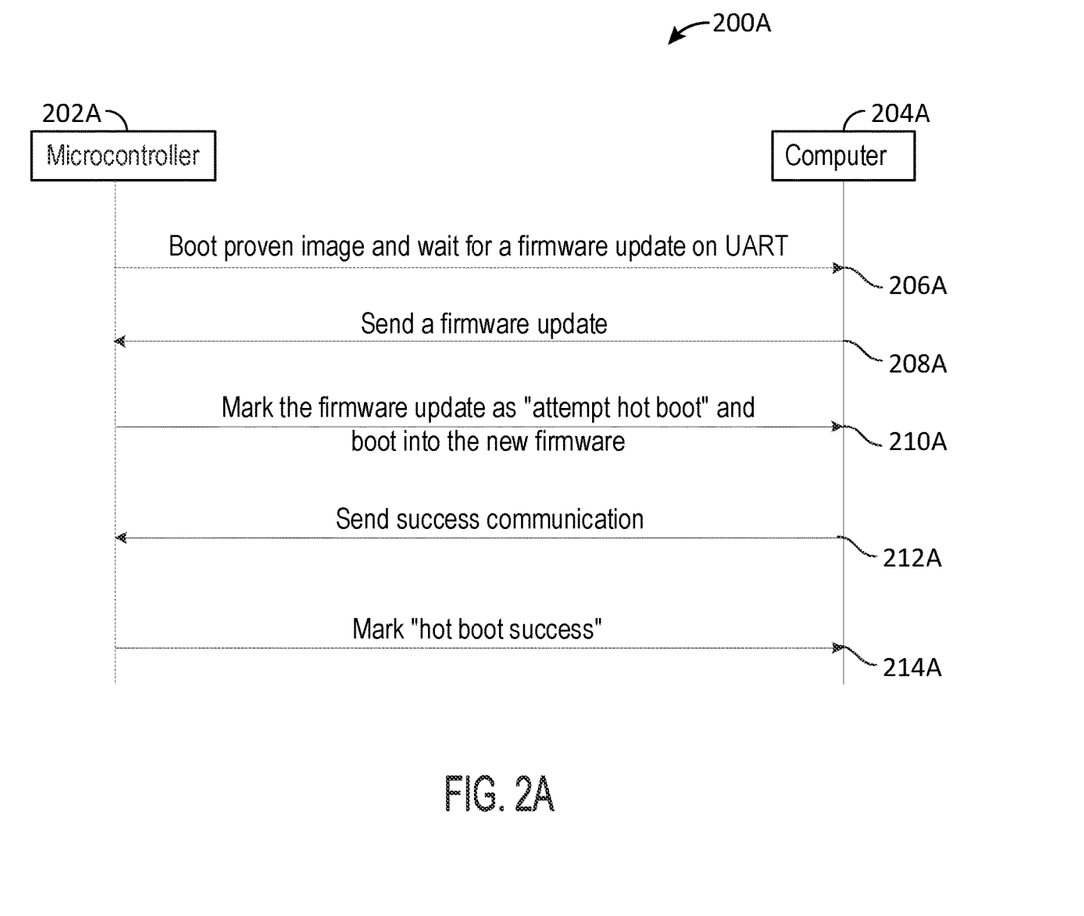
FIGS. 2A to 2C illustrate a block diagram of an example process for improving a firmware update mechanism of a power distribution board, according to some aspects of the disclosed technology.
Figure 2B:
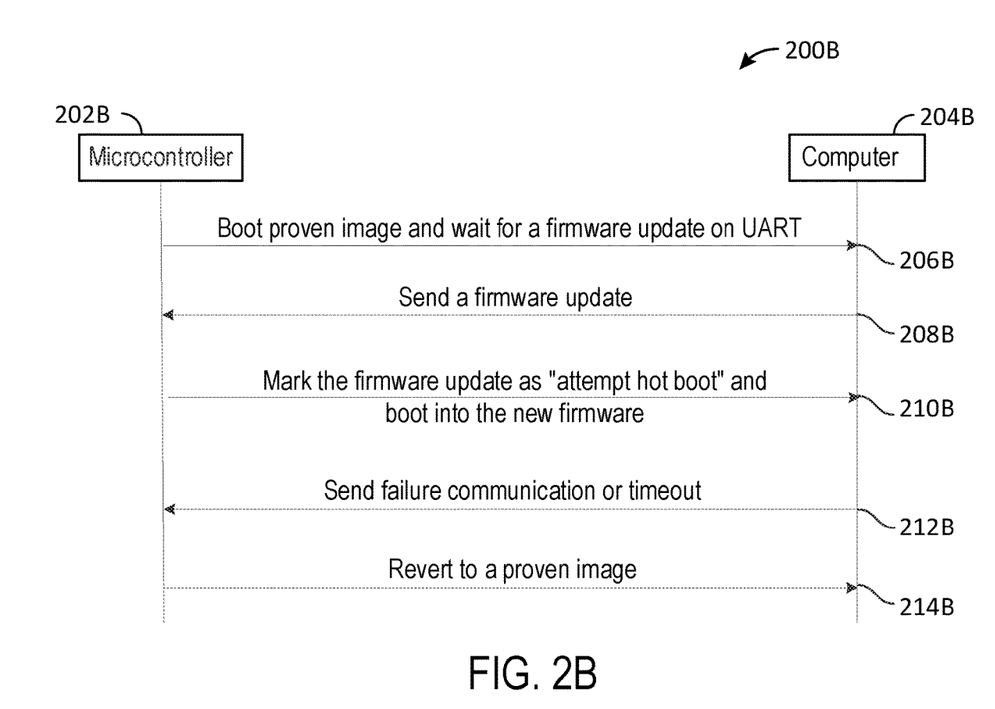
Figure 2C:
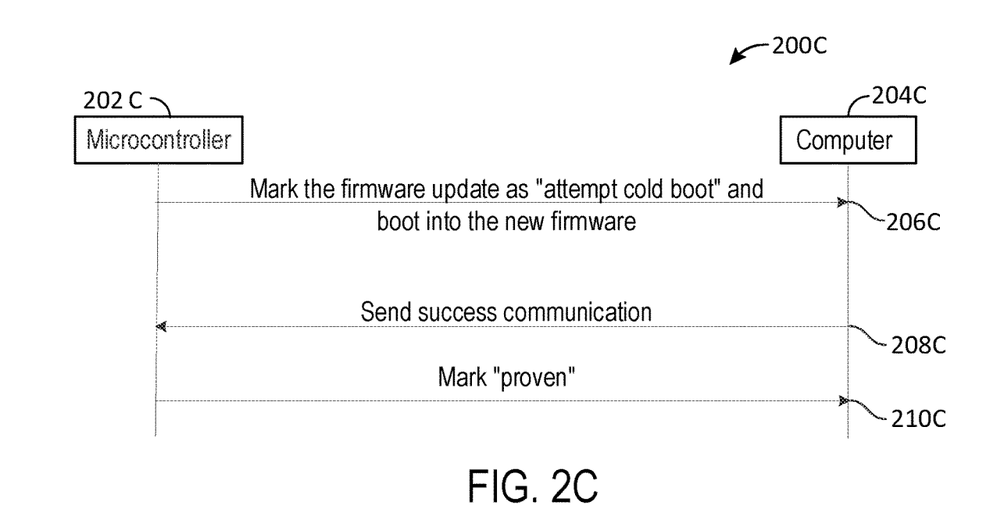

FIGS. 2A to 2C illustrate a block diagram of an example process 200A-200C for improving a firmware update mechanism of a power distribution board, according to some aspects of the disclosed technology. As previously mentioned, the firmware update mechanism can be improved by utilizing various boot procedures based on the mutually dependent relationship between a power distribution board and a computer. Process 200A-200C for improving the firmware update mechanism includes interaction between microcontroller 202 (e.g., 202A, 202B, and 202C) on a power distribution board and computer 204 (e.g., 204A, 204B, and 204C) in various boot procedures (e.g., warm boot procedure or cold boot procedure). In some examples, the term "power distribution board" can be generally used to describe a microcontroller and all other components on the power distribution board as a single unit.

In some embodiments, microcontroller 202 on the power distribution board and computer 204 can reside on AVs, where the power distribution board controls the power distribution of various components of AVS including microcontroller 202 and computer 204. More specifically, in some instances, a microcontroller (MCU) on the power distribution can signal the power switching circuitry of the power distribution board.

FIG. 2A illustrates a block diagram of an example process 200A including a warm boot procedure. Process 200A of the warm boot procedures includes communication between microcontroller 202A on a power distribution board and computer 204A that is powered by the power distribution board. In some embodiments, microcontroller 202A boots into a firmware using a proven image (i.e., prior known working image) and waits for a firmware update on a device that transmits a serial communication (e.g., Universal Asynchronous Receiver/Transmitter (UART), which is a physical circuit in a microcontroller) (step 206A). In some instances, computer 204A sends a firmware update to microcontroller 202A (step 208A). When microcontroller 202A receives the firmware update from computer 204A, microcontroller 202A can mark the new firmware (i.e., firmware update) as "attempt hot boot" and boot into the new firmware (step 210A). With a warm boot, which can be interchangeably used with the term "hot boot," a system does not lose power during the reset. Rather, a microcontroller on a power distribution board simply restarts the running application without interrupting power (e.g., hitting "restart" on Windows). More specifically, during a hot boot, the running application (e.g., a monolithic binary) can effectively halt and had control back to the bootloader (e.g., another monolithic binary). The bootloader then can restart the application, which re-initializes itself and the hardware. On the other hand, a cold boot is the process of starting up a machine that is powered down.

In some instances, microcontroller 202A can wait for a communication from computer 204A regarding a success check of the new firmware. If computer 204A sends a communication or message indicating that the firmware update is successful (step 212A), microcontroller 202A can mark the new firmware as "hot boot success" (step 214A).

There can be various mechanisms to determine whether the firmware update is successful or failed. For example, one way is to implement, on the power distribution board, a Command Line Interface (CLI) command such as "confirm comms." When the "confirm comms" command is run (i.e., executed by the computer), the power distribution board can consider the execution by the computer as a "comms success" indicating that the firmware update is successful. If, however, a certain amount of time (e.g., 10 seconds) passes without the "confirm comms" command being run (i.e., the computer does not execute the command within a certain amount of time), the power distribution board can take the absence or delay of the execution by the computer as a "comms failure" indicating that the firmware update is failed.

FIG. 2B illustrates a block diagram of an example process 200B when a warm boot procedure fails. Similar to steps 206A-210A, microcontroller 202B boots into firmware using a proven image and waits for a firmware update on UART (step 206B). At step 208B, computer 204B sends a firmware update to microcontroller 202B. Then, microcontroller 202B can mark the new firmware received from computer 204B as "attempt hot boot" and boot into the new firmware (step 210B). If computer 204B sends a communication or message indicating that the firmware update is failed (step 212B) or microcontroller 202B does not receive any communication from computer 204B within a predetermined time limit (i.e., timeout), microcontroller 202B can revert to the proven image that it was initially booted into at step 206B (step 214B).

Furthermore, in some instances, a power distribution board can have at least one proven image stored in memory such that microcontroller 202B can revert to the proven image if microcontroller 202B loses power before any successful warm boot procedure. For example, a power distribution board can have two slots for its firmware to be stored in flash. In some examples, when the power distribution board receives a firmware update, it can overwrite one of the slots and keeps the remaining slot for a proven image so that the microcontroller can revert to the proven image in case of a failed boot procedure or timeout.

FIG. 2C illustrates a block diagram of an example process 200C of a cold boot procedure. During the cold boot procedure 200C, microcontroller 202C can mark the firmware update received from computer 204C as "attempt cold boot" and boot into the new firmware (step 206C). If computer 204C sends a communication indicating that the firmware update is successful (step 208C), microcontroller 202C can mark the new firmware as "proven" (step 210C).

Figure 3:
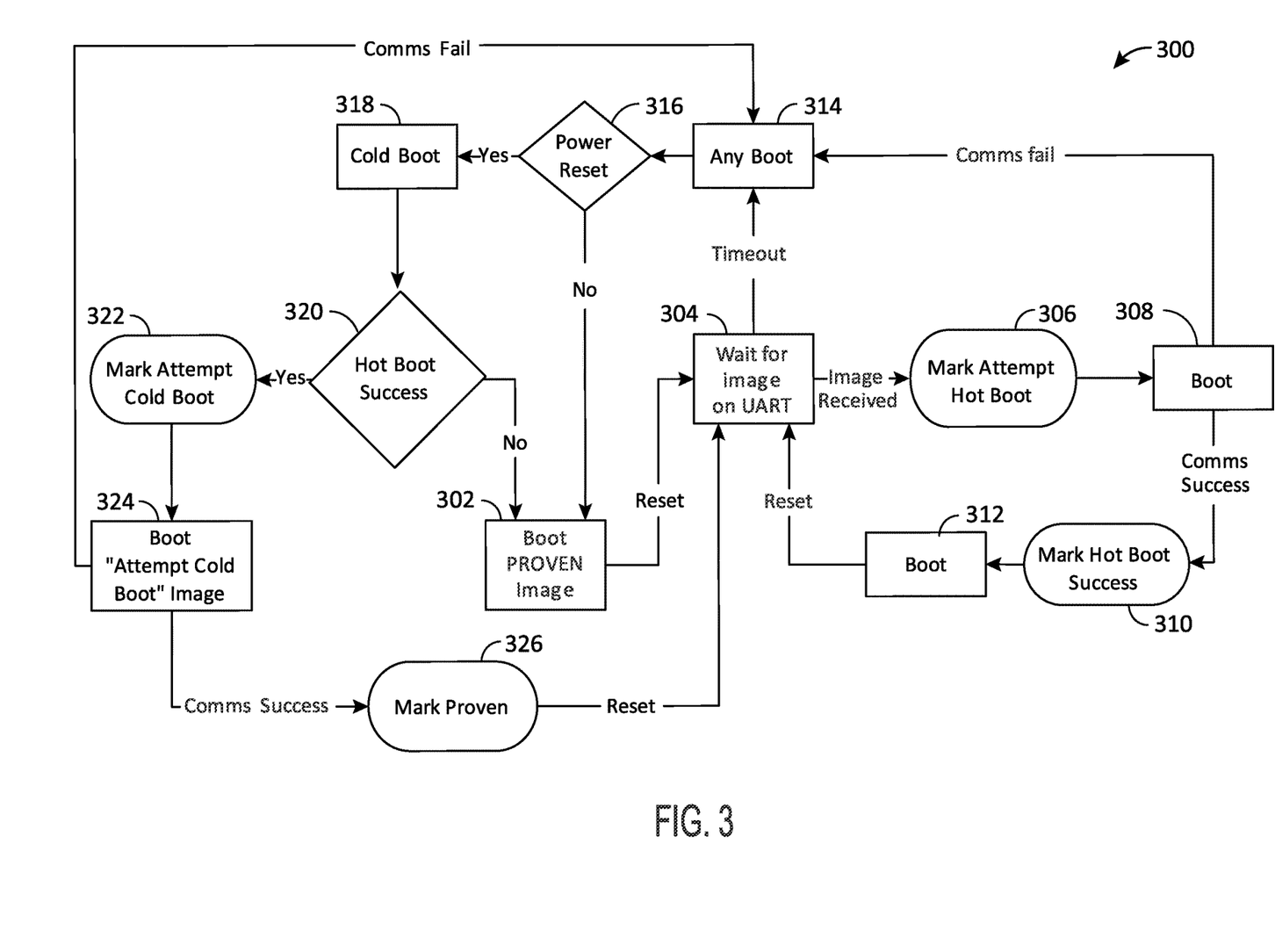
FIG. 3 illustrates a conceptual block diagram of an example process for improving a firmware update mechanism in a full power lifecycle of a power distribution board, according to some aspects of the disclosed technology.

FIG. 3 illustrates a conceptual block diagram of an example process 300 for improving a firmware update mechanism, according to some aspects of the disclosed technology. Specifically, FIG. 3 describes firmware update mechanism 300 during an entire lifecycle of a power distribution board (e.g., power distribution board 102B illustrated in FIG. 1B). In some embodiments, during a full power cycle of the power distribution board, firmware update mechanism 300 can include two stages: first, a warm boot procedure where a microcontroller on the power distribution board immediately performs a warm reset based on the firmware update received from a computer to prove that the new firmware does not instantly shut everything in the system off, and secondly, a cold boot procedure where the microcontroller waits to finalize the firmware update until a full power reset of the whole system to determine that the new firmware can boot into the new firmware without any interruption in the system across the firmware update.

Furthermore, during the warm boot procedure or the cold boot procedure, a message or any type of communication from the computer that is providing the firmware update can be used as a parameter to determine whether the firmware update is successful or failed for each stage.

In addition, during the full power cycle of the power distribution board, the firmware update can include a state, which can progress from "untested/unproven", "attempt hot boot", "hot boot success", "attempt cold boot", and to "proven." More specifically, in some examples, "untested/unproven" and "attempt hot boot" can refer to the same state when the full power cycle of the power distribution board begins with the "attempt hot boot" with a "untested/unproven" image. Throughout the full power cycle, the firmware update can be marked with one of the above-listed states based on the progress. In some instances, such markings can help the power distribution board determine or detect a successful or failed firmware update so that the power distribution board can react accordingly (e.g., revert to the previous proven image, proceed to a cold boot procedure, or mark the firmware update with proven).

In some embodiments, at step 302, a microcontroller on a power distribution board can boot into a proven image. The proven image is a previously proven firmware that can safely run on the microcontroller. In some instances, the microcontroller can reset and get into a state where it is capable of a firmware update. The microcontroller can wait for a firmware update request on a device that transmits and receives serial data regarding the firmware update (e.g., UART) at step 304. For example, when the microcontroller is reset, a bootloader on the microcontroller can check to see if a firmware update request is received. When a firmware update is received from the computer whose power is controlled by the power distribution board, the microcontroller can mark the new firmware as "attempt hot boot" at step 306 to indicate that the firmware is yet to be proven.

In some examples, the microcontroller can boot into the new firmware based on the "attempt hot boot" at step 308. The computer that provides the firmware update can send a message or any type of communication to the microcontroller indicating whether the new firmware update is successful or failed. If the message or communication from the computer indicates that the firmware update is successful, the microcontroller can mark the new firmware as "hot boot success" at step 310. For example, the microcontroller can mark the new firmware as "hot boot success" in memory. In some instances, the marking can be stored alongside the firmware itself, for example, in flash memory. Alternatively, the marking can be stored in non-volatile memory that the microcontroller can have an access (e.g., Electrically Erasable Programmable Read-Only Memory (EEPROM)).

If the microcontroller does not receive any communication from the computer within a predetermined time limit, or if the message or communication from the computer indicates that the firmware update is failed, the microcontroller can revert to the previous proven image at step 302.

At step 312, after the successful warm boot procedure, the microcontroller can continue to operate and perform as many resets as applicable until the whole system fully resets (e.g., until an AV is fully reset naturally). The microcontroller is not forced to or does not immediately proceed towards the cold boot procedure after the successful warm boot procedure. Also, if the microcontroller receives another firmware update from the computer after the successful warm boot procedure but before a cold boot procedure, the microcontroller can perform another warm boot procedure based on the other firmware update. In some instances, the computer can transmit a message (e.g., pop-up warning) to an operator to suggest a power on/off, but does not force a shutdown of the system.

At step 314, the microcontroller can wait for any type of boot (e.g., warm boot or cold boot). At step 316, the microcontroller can determine that a full power reset of the system is to be performed. Then, the microcontroller can proceed with a cold boot procedure at step 318. If not, the microcontroller can revert to the previous proven image at step 302.

In the cold boot procedure, at step 320, the microcontroller can determine whether the warm boot procedure based on the firmware update was successful. If not, the microcontroller can revert to the proven image that it was booted into at step 302 before any boot procedure. Once the microcontroller confirms that the warm boot procedure was successful based on the firmware update, the microcontroller can mark the new firmware as "attempt cold boot" at step 322. Then, the microcontroller can boot into the new firmware at step 324. If the microcontroller receives a message or any type of communication from the computer indicating that the firmware update is successful, the microcontroller can mark the firmware as proven at step 326.

However, if the message received from the computer indicates that the firmware update is failed, or if the microcontroller does not receive any communication from the computer, the microcontroller can revert to the proven image.

Figure 4:
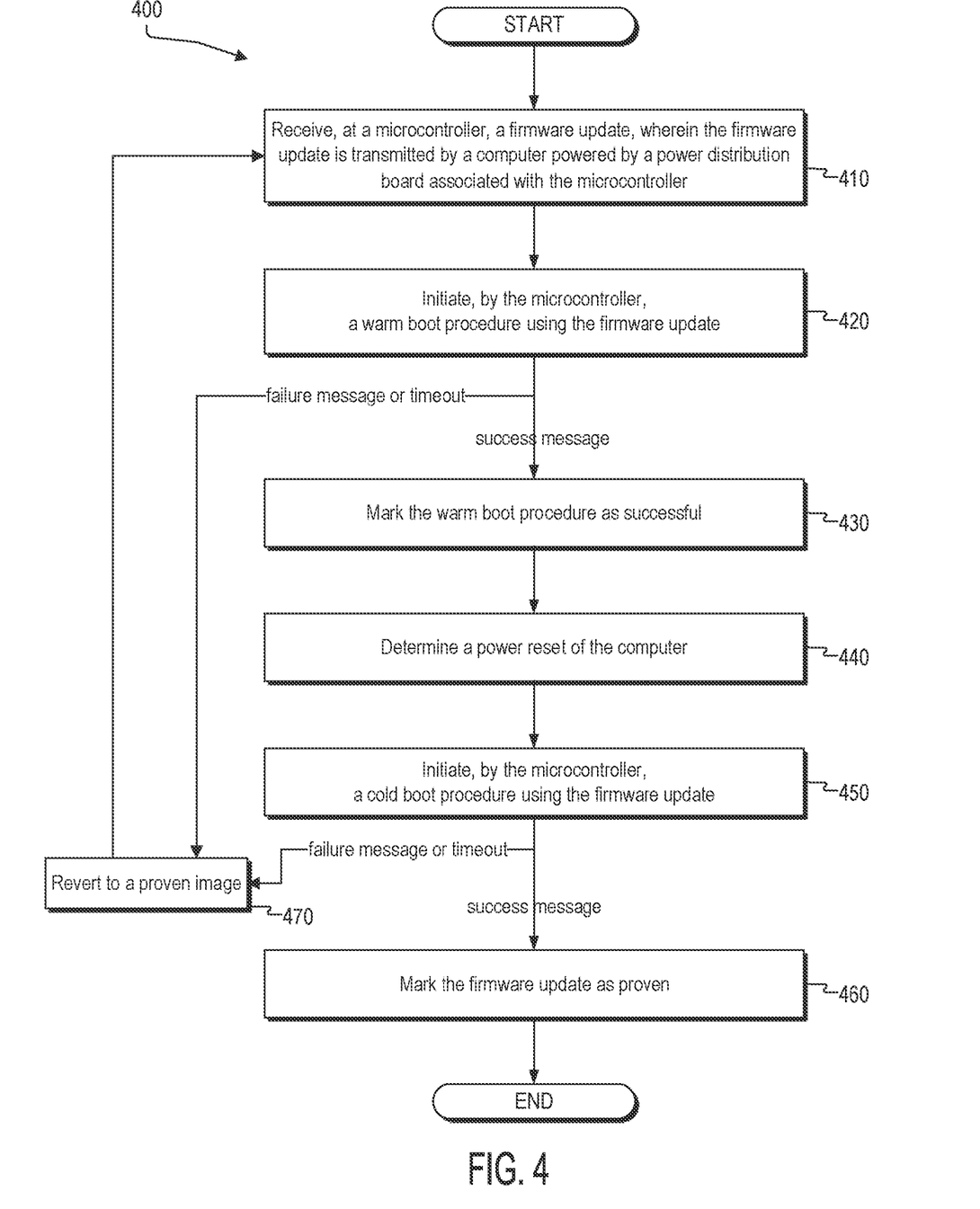
FIG. 4 illustrates a flow chart of an example method for improving a firmware update mechanism of a power distribution board, according to some aspects of the disclosed technology.

FIG. 4 illustrates a flow chart of an example method 400 for improving a firmware update mechanism, according to some aspects of the disclosed technology. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements the method 400 may perform functions at substantially the same time or in a specific sequence.

Process 400 begins with step 410, in which a microcontroller (e.g., microcontroller 202A, 202B, or 202C in FIGS. 2A-2C) on a power distribution board (e.g., power distribution board 102B in FIG. 1B) receives a firmware update from a computer (e.g., computer 104B in FIG. 1 or computer 204A, 204B, or 204C in FIGS. 2A-2C). In some aspects, the computer is powered by the power distribution board associated with the microcontroller. Furthermore, in some examples, the microcontroller is powered by the power distribution board.

At step 420, the microcontroller initiates a warm boot procedure based on the firmware update received from the computer at step 410. The warm boot procedure includes an immediate warn reset without interrupting any power supply.

At step 430, the microcontroller marks the warm boot procedure as successful if a message received from the computer indicates that the firmware update is successful. If the message from the computer indicates that the firmware update during the warm boot procedure is failed or if the microcontroller does not receive any communication from the computer within a predetermined time limit, the microcontroller can revert to the proven image that it was initially booted prior to the warm boot procedure at step 470.

At step 440, the microcontroller determines that the computer is to have a full power reset. For example, the microcontroller checks to see if the computer is to have a warm reset (e.g., restart without interrupting power supply) or a cold boot (e.g., restart from a full shut down of the entire system) and proceeds to step 450 if the computer is to have a cold boot.

At step 450, the microcontroller initiates a cold boot procedure using the firmware update. The cold boot procedure includes a reset of the whole system from a full shut down to determine a correct configuration across the firmware update.

At step 460, the microcontroller marks the new firmware as proven if a message received from the computer indicates that the firmware update is successful. If the message from the computer indicates that the firmware update during the cold boot procedure is failed or if the microcontroller does not receive any communication from the computer within a predetermined time limit, the microcontroller can revert to the proven image that it was initially booted prior to the warm boot procedure at step 470.

Figure 5:
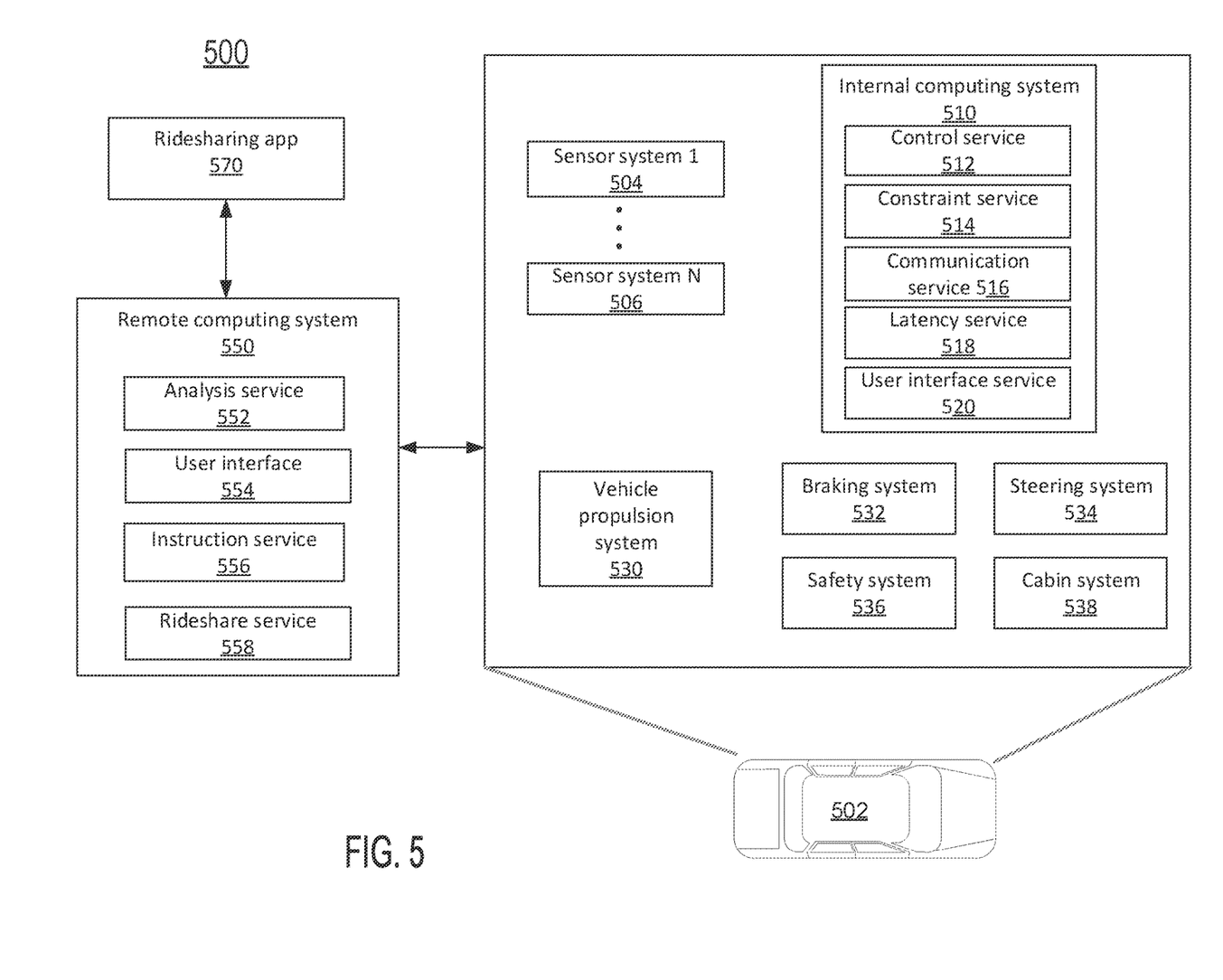
FIG. 5 illustrates an example system environment that can be used to facilitate AV dispatch and operations, according to some aspects of the disclosed technology.

Turning now to FIG. 5 illustrates an example of an AV management system 500. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 502 can navigate about roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors.

AV 502 can also include several mechanical systems that can be used to maneuver or operate AV 502. For instance, the mechanical systems can include vehicle propulsion system 530, braking system 532, steering system 534, safety system 536, and cabin system 538, among other systems. Vehicle propulsion system 530 can include an electric motor, an internal combustion engine, or both. The braking system 532 can include an engine brake, brake pads, actuators, and/or any other suitable componentry configured to assist in decelerating AV 502. The steering system 534 can include suitable componentry configured to control the direction of movement of the AV 502 during navigation. Safety system 536 can include lights and signal indicators, a parking brake, airbags, and so forth. The cabin system 538 can include cabin temperature control systems, in-cabin entertainment systems, and so forth. In some embodiments, the AV 502 may not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a planning stack 516, a control stack 518, a communications stack 520, an HD geospatial database 522, and an AV operational database 524, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception stack 512 can detect and classify objects and determine their current and predicted locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth.

Mapping and localization stack 514 can determine the AV's position and orientation (pose) using different methods from multiple systems (e.g., GPS, IMUS, cameras, LIDAR, RADAR, ultrasonic sensors, the HD geospatial database 522, etc.). For example, in some embodiments, the AV 502 can compare sensor data captured in real-time by the sensor systems 504-508 to data in the HD geospatial database 522 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The planning stack 516 can determine how to maneuver or operate the AV 502 safely and efficiently in its environment. For example, the planning stack 516 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another. The planning stack 516 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 516 can select from multiple backup plans to carry out. For example, while preparing to change lanes to turn right at an intersection, another vehicle may aggressively cut into the destination lane, making the lane change unsafe. The planning stack 516 could have already determined an alternative plan for such an event, and upon its occurrence, help to direct the AV 502 to go around the block instead of blocking a current lane while waiting for an opening to change lanes.

The control stack 518 can manage the operation of the vehicle propulsion system 530, the braking system 532, the steering system 534, the safety system 536, and the cabin system 538. The control stack 518 can receive sensor signals from the sensor systems 504-508 as well as communicate with other stacks or components of the local computing device 510 or a remote system (e.g., the data center 550) to effectuate operation of the AV 502. For example, the control stack 518 can implement the final path or actions from the multiple paths or actions provided by the planning stack 516. This can involve turning the routes and decisions from the planning stack 516 into commands for the actuators that control the AV's steering, throttle, brake, and drive unit.

The communication stack 520 can transmit and receive signals between the various stacks and other components of the AV 502 and between the AV 502, the data center 550, the client computing device 570, and other remote systems. The communication stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 520 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 522 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508 and other components of the AV 502 and/or data received by the AV 502 from remote systems (e.g., the data center 550, the client computing device 570, etc.). In some embodiments, the raw AV data can include HD LIDAR point cloud data, image data, RADAR data, GPS data, and other sensor data that the data center 550 can use for creating or updating AV geospatial data as discussed further below with respect to FIG. 2 and elsewhere in the present disclosure.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and client computing device 570. These signals can include sensor data captured by the sensor systems 504-508, roadside assistance requests, software updates, ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, a ridesharing platform 560, and map management system platform 562, among other systems.

Data management platform 552 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management system platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management system platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from the map management system platform 562; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to be picked up or dropped off from the ridesharing application 572 and dispatch the AV 502 for the trip.

Map management system platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, UAVs, satellites, third-party mapping services, and other sources of geospatially referenced data. The raw data can be processed, and map management system platform 562 can render base representations (e.g., tiles (2D), bounding volumes (3D), etc.) of the AV geospatial data to enable users to view, query, label, edit, and otherwise interact with the data. Map management system platform 562 can manage workflows and tasks for operating on the AV geospatial data. Map management system platform 562 can control access to the AV geospatial data, including granting or limiting access to the AV geospatial data based on user-based, role-based, group-based, task-based, and other attribute-based access control mechanisms. Map management system platform 562 can provide version control for the AV geospatial data, such as to track specific changes that (human or machine) map editors have made to the data and to revert changes when necessary. Map management system platform 562 can administer release management of the AV geospatial data, including distributing suitable iterations of the data to different users, computing devices, AVs, and other consumers of HD maps. Map management system platform 562 can provide analytics regarding the AV geospatial data and related data, such as to generate insights relating to the throughput and quality of mapping tasks.

In some embodiments, the map viewing services of map management system platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
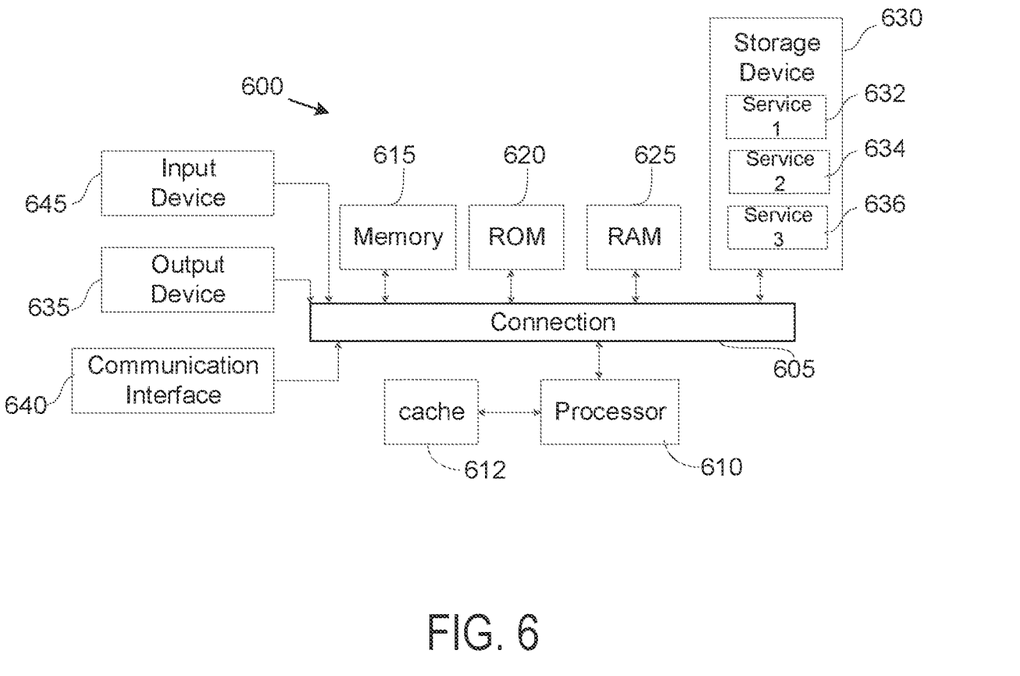
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up internal computing system 610, remote computing system 650, a passenger device executing the rideshare app 670, internal computing device 630, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
   sending, by a computer powered by a power distribution board associated with a controller, a firmware update to the controller;
   determining a status of an update of a firmware of the power distribution board after a warm boot procedure initiated by the controller using the firmware update, the status of the update of the firmware indicating whether the firmware of the power distribution board was successfully updated using the firmware update; and
   sending, by the computer to the controller, a message indicating whether the firmware of the power distribution board was successfully updated using the firmware update.

2. The method of claim 1, wherein determining the status of the update of the firmware and sending the message to the controller comprises generating, by the computer, an instruction to execute a command at the power distribution board.

3. The method of claim 2, wherein generating an instruction to execute a command at the power distribution board comprises executing the command on a command line interface of the power distribution board.

4. The method of claim 1, further comprising:
determining that the firmware update failed; and
sending, by the computer, the message to the controller, wherein the message indicates that the firmware update failed.

5. The method of claim 1, further comprising:
determining that the firmware update was successful; and
sending, by the computer, the message to the controller, wherein the message indicates that the firmware update was successful.

6. The method of claim 1, further comprising:
determining a power reset of the computer; and
after the controller initiated a cold boot procedure using the firmware update, sending, by the computer to the controller, the message indicating whether the firmware of the power distribution board was successfully updated using the firmware update.

7. The method of claim 1, further comprising:
sending, by the computer to the controller, an additional firmware update, the additional firmware update being sent after successful completion of the warm boot procedure and before a cold boot procedure is performed; and
generating, by the computer, a notification recommending a power cycle of a system comprising the computer, the power distribution board, and the controller.

8. A system comprising:
a computer powered by a power distribution board associated with a controller, the computer comprising at least one memory and one or more processors coupled to the at least one memory, the computer configured to:
send a firmware update to the controller;
determine a status of an update of a firmware of the power distribution board after a warm boot procedure initiated by the controller using the firmware update, the status of the update of the firmware indicating whether the firmware of the power distribution board was successfully updated using the firmware update; and
send, to the controller, a message indicating whether the firmware of the power distribution board was successfully updated using the firmware update.

9. The system of claim 8, wherein determining the status of the update of the firmware and sending the message to the controller comprises generating, by the computer, an instruction to execute a command at the power distribution board.

10. The system of claim 9, wherein generating an instruction to execute a command at the power distribution board comprises executing the command on a command line interface of the power distribution board.

11. The system of claim 8, wherein the computer is configured to:
determine that the firmware update failed; and
send the message to the controller, wherein the message indicates that the firmware update failed.

12. The system of claim 8, wherein the computer is configured to:
determine that the firmware update was successful; and
send the message to the controller, wherein the message indicates that the firmware update was successful.

13. The system of claim 8, wherein the computer is configured to:
determine a power reset of the computer; and
after the controller initiated a cold boot procedure using the firmware update, send, to the controller, the message indicating whether the firmware of the power distribution board was successfully updated using the firmware update.

14. The system of claim 8, wherein the computer is configured to:
send, to the controller, an additional firmware update, the additional firmware update being sent after successful completion of the warm boot procedure and before a cold boot procedure is performed; and
generate a notification recommending a power cycle of the system, wherein the system comprises the computer, the power distribution board, and the controller.

15. A non-transitory computer-readable medium comprising instructions stored thereon which, when executed by a computer, cause the computer to:
send a firmware update to a controller associated with a power distribution board that powers the computer;
determine a status of an update of a firmware of the power distribution board after a warm boot procedure initiated by the controller using the firmware update, the status of the update of the firmware indicating whether the firmware of the power distribution board was successfully updated using the firmware update; and
send, to the controller, a message indicating whether the firmware of the power distribution board was successfully updated using the firmware update.

16. The non-transitory computer-readable medium of claim 15, wherein determining the status of the update of the firmware and sending the message to the controller comprises generating an instruction to execute a command at the power distribution board.

17. The non-transitory computer-readable medium of claim 16, wherein generating an instruction to execute a command at the power distribution board comprises executing the command on a command line interface of the power distribution board.

18. The non-transitory computer-readable medium of claim 15, wherein the instructions, when executed by the computer, cause the computer to:
determine that the firmware update was successful; and
send the message to the controller, wherein the message indicates that the firmware update was successful.

19. The non-transitory computer-readable medium of claim 15, wherein the instructions, when executed by the computer, cause the computer to:
determine a power reset of the computer; and
after the controller initiated a cold boot procedure using the firmware update, send, to the controller, the message indicating whether the firmware of the power distribution board was successfully updated using the firmware update.

20. The non-transitory computer-readable medium of claim 15, wherein the instructions, when executed by the computer, cause the computer to:
send, to the controller, an additional firmware update, the additional firmware update being sent after successful completion of the warm boot procedure and before a cold boot procedure is performed; and generate a notification recommending a power cycle of the system, wherein the system comprises the computer, the power distribution board, and the controller.

\* \* \* \* \*